Figure 1:
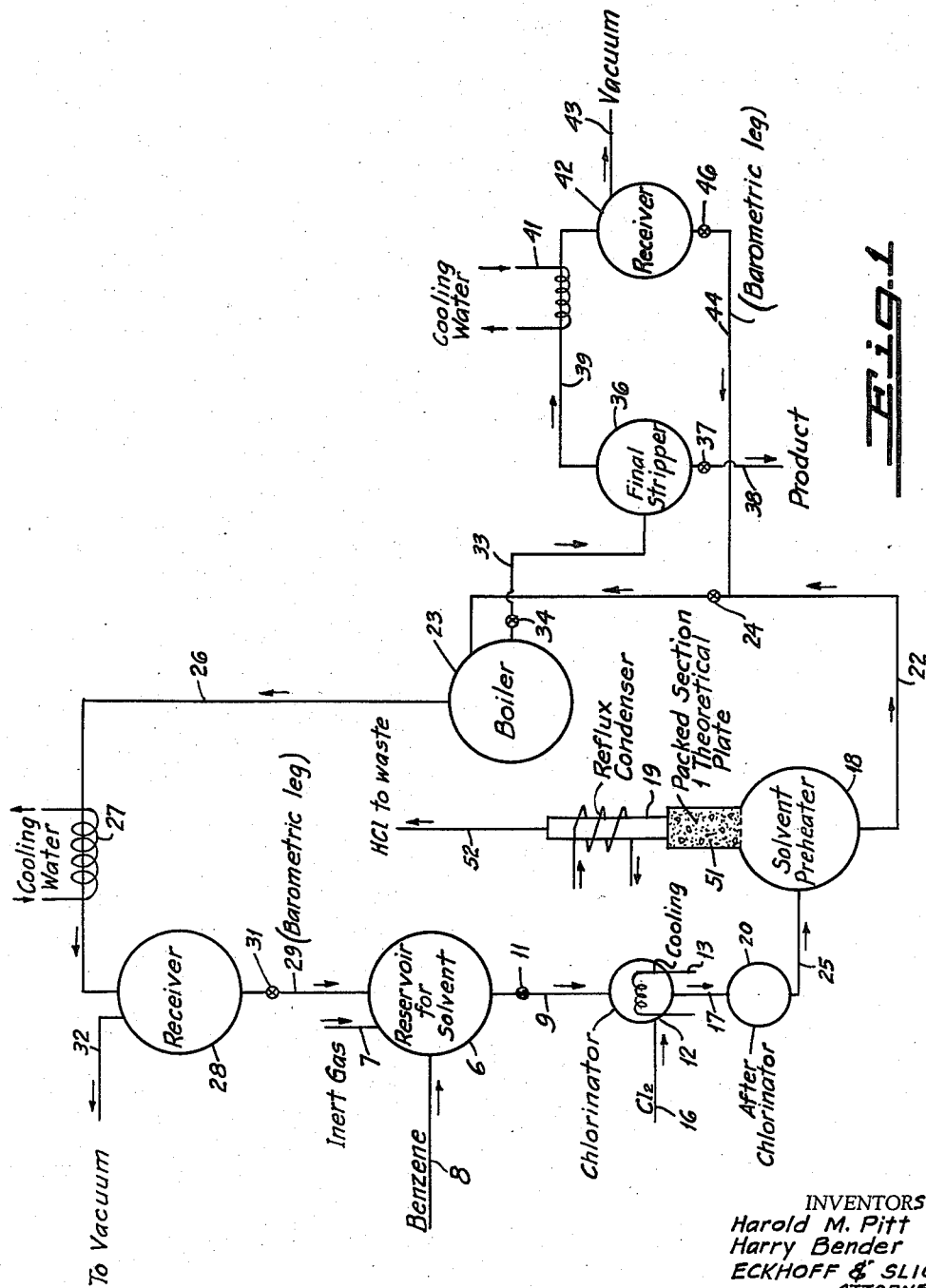

INVENTORS
Harold M. Pitt
Harry Bender
ECKHOFF & SLICK
ATTORNEYS

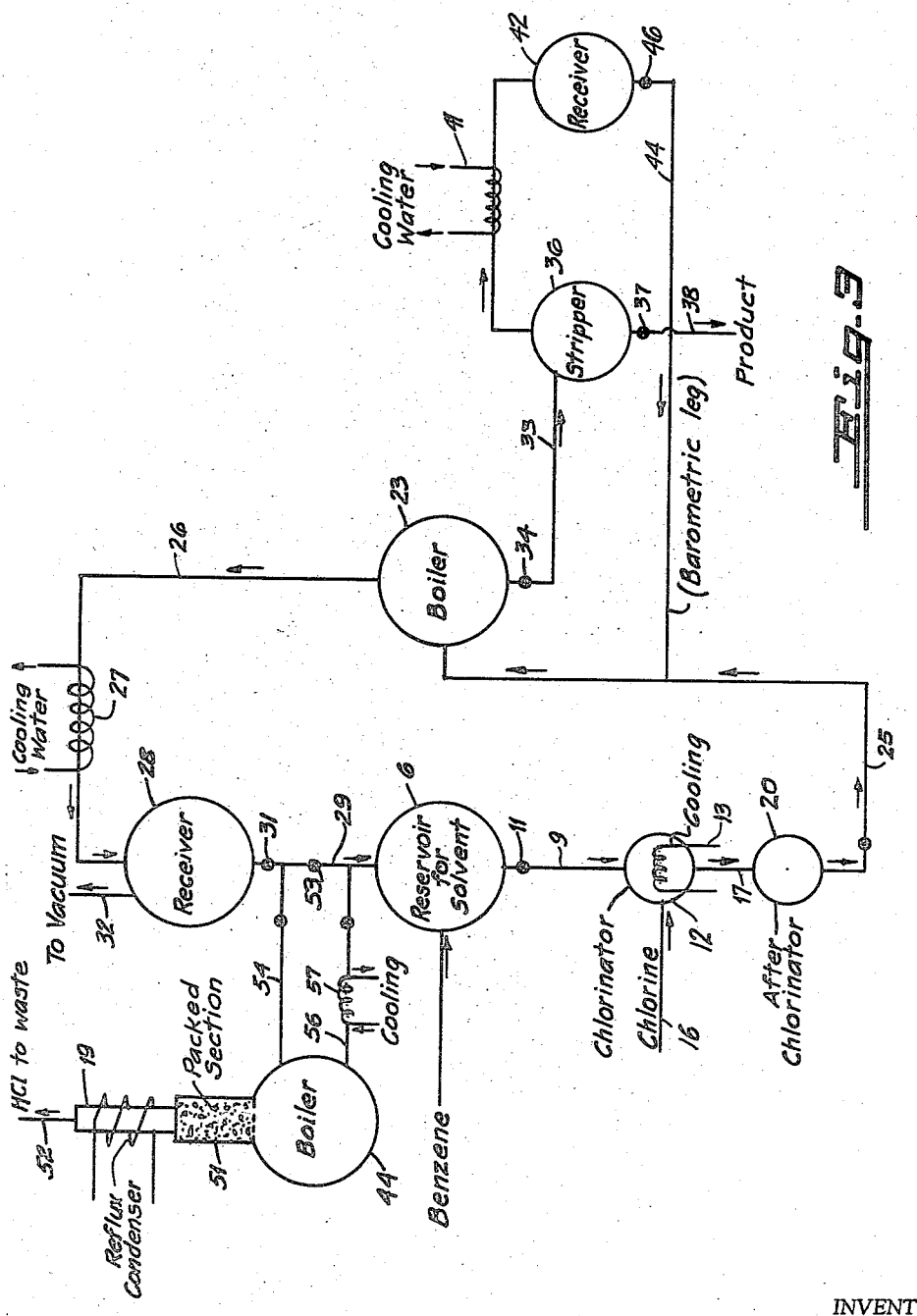

United States Patent Office 2,857,437
Patented Oct. 21, 1958

2,857,437

PROCESS FOR PRODUCING HEXACHLOROCYCLOHEXANE

Harold M. Pitt and Harry Bender, Torrance, Calif., assignors to Stauffer Chemical Company, a corporation of Delaware Application June 5, 1957, Serial No. 663,793

10 Claims. (Cl. 260—648)

This invention relates to a process for the production of benzene hexachloride, also called hexachlorocyclohexane. As is well known, hexachlorocyclohexane exists in various isomeric forms and, of these, that known as the gamma isomer has valuable insecticidal properties.

To secure a product containing from 20% to 35% and above of the gamma isomer, three conditions must be observed, as follows: (1) One must have present acetic anhydride in an amount in excess of the unreacted benzene present; (2) the reacting mass must be maintained at a temperature between 5° C. and −25° C. and preferably between 0° C. and −15° C.; and (3) during the course of the reaction, a carefully regulated quantity of unreacted chlorine must be maintained in the reaction zone. The importance of observing these conditions will be appreciated when it is pointed out that the best yield of gamma isomer obtainable in present commercial practice is from 12% to 14%.

The process is carried on as a continuous operation, a solvent mixture containing benzene being fed continuously into a reaction zone wherein the mixture is agitated vigorously to provide a homogeneous reaction medium in which hexachlorocyclohexane is formed. A continuous stream is removed from the reaction zone containing hexachlorocyclohexane, unreacted benzene, unreacted chlorine and solvent mixture. The solvent mixture contains acetic anhydride and a small amount of acetyl chloride and acetic acid. This invention relates more particularly to the separation and recovery of the solvent mixture for re-use in the process.

The ratio of acetic anhydride to benzene should preferably be such that the acetic anhydride is in considerable excess of the benzene present and we prefer to use at least two parts of anhydride to one of benzene and as much as several hundred parts to one of benzene can be employed. We prefer to use the minimum concentration of benzene required to maintain the rate at an economical level. For example, we have reacted 1.5 pounds of chlorine per hour with 6 watts of light intensity with only about 4 mole percent of benzene in acetic anhydride at −10° C.; we have operated successfully with as small a benzene concentration in the anhydride as one-half mole percent.

While one can operate at relatively elevated temperatures of the order of 5° C., we prefer to operate at 0° C. and below, utilizing temperatures of −5° C. to −25° C. As the temperature is lowered, the cost of refrigeration may offset the advantage gained in gamma isomer yield and the actual temperature to be employed in the range of 5° C. to −25° C. is a matter of economic study.

The chlorine concentration in the reaction mass must be maintained between certain limits and it is for this reason that the process of this invention cannot be practiced batchwise with all reactants added at one time. The steady chlorine concentration in the reaction mass should be maintained below $(0.241 \times °K. - 53.8)$ grams per liter of reaction mass as an upper limit, and above $(0.01776 \times °K. - 3.96)$ grams per liter of reaction mass as a lower limit, where °K. is the absolute temperature of the reaction mass. If one operates with a chlorine concentration between these values at a given temperature, one will obtain an increase in the gamma isomer yield and the product will contain over 20% of the gamma isomer if the other conditions are also observed; the optimum free chlorine concentration for any temperature in the range of 5° C. to −25° C. is $$(0.0326 \times °K. - 7.1)$$

grams per liter of reaction mass. The production of gamma isomer decreases less when the chlorine concentration is more rather than less than the optimum concentration. Therefore, if one cannot operate at the precise optimum concentration, one should operate with slightly more chlorine rather than with only a minimum excess of chlorine.

When benzene is chlorinated in acetic anhydride, the hexachlorocyclohexane product contained contains as much as 10% of a component which remains as a liquid when the product is crystallized; we term this liquid an "oil." It is undesirable in the chlorination product because it interferes with crystallization of the product, its grinding and use. The oil can be eliminated or reduced to a negligible amount if oxygen is rigidly excluded and if a suitable solvent such as carbon tetrachloride is present during the reaction. The presence of the carbon tetrachloride also enables the quantity of hexachlorocyclohexane present in solution to be increased. This is important at the lower temperatures because the solubility of hexachlorocyclohexane in acetic anhydride is small as compared to its solubility in the mixture of acetic anhydride and carbon tetrachloride; for example, at −10° C., the use of 35% carbon tetrachloride by volume in the solvent mixture increases the solubility of hexachlorocyclohexane to 160% of its solubility in the solvent mixture without the carbon tetrachloride.

The upper limit on the quantity of carbon tetrachloride present in the solvent mixture is established by its effect in reducing the ratio of acetic anhydride to benzene because a reduction in this ratio results in lowering the yield of gamma isomer; generally, the acetic anhydride should provide at least one-fourth of the carbon tetrachloride-acetic anhydride quantity present in the reaction zone.

The process of this invention is not limited to the use of carbon tetrachloride in the solvent mixture; it is desirable to use carbon tetrachloride but it is not essential. Excess benzene can be used as a solvent but not as advantageously as carbon tetrachloride. Both provide, in effect, an inert diluent in the solvent mixture which is effective to increase the quantity of hexachlorocyclohexane which can be carried in solution. Other hexachlorocyclohexane solvents can be used such as methylene chloride, chloroform, ethylene dichloride, trichloroethane, but these are not as desirable as carbon tetrachloride since they react in use and so provide other problems.

In the operation of the process, the stability of the hexachlorocyclohexane solvent mixture is affected adversely by two factors. The first factor is in the aforementioned "oil formation," which results in the production of a small amount of acetyl chloride. The second factor is provided by the chlorination of a small amount of the acetic anhydride to a mixed monochloroacetic acid-acetic anhydride product which is removed with the product, hexachlorocyclohexane. Upon formation of the mixed monochloroacetic acid-acetic anhydride product, hydrogen chloride is formed concurrently. The hydrogen chloride reacts with the acetic anhydride present to form acetic acid and acetyl chloride. If this is allowed to proceed, the acetic anhydride present will be completely destroyed and the liquid solvent stream circulated will contain acetic acid and acetyl chloride instead of the desired acetic anhydride. A reduction in the gamma isomer content of the product and a decrease in solubility of the hexachlorocyclohexane in the solvent mixture follows the reduction in acetic anhydride content; if carbon tetrachloride is used as a solvent for the hexachlorocyclohexane, a reduction in its volume also follows an increase in the volume of acetyl chloride and acetic acid since the capacity of the reaction system is usually fixed.

We have found that the solvent mixture can be continuously reconstituted and the acetic anhydride content maintained at a desired ratio to the benzene content. We have found that the acetic acid and acetyl chloride can be successfully reconstituted to acetic anhydride by heating the mixture to form acetic anhydride and hydrogen chloride, the latter being removed.

This reaction is carried out by heating the mixture issuing from the reaction zone to vaporize acetic acid and acetyl chloride from the hexachlorocyclohexane and acetic anhydride which remain in the still pot. The volatilized acetic acid and acetyl chloride react to form liquid acetic anhydride which drops back into the pot while the hydrogen chloride passes off as a gas. In this manner, the process can be practiced continuously and the solvent mixture maintained of a uniform composition. Some acetyl chloride and acetic acid remain in the solvent mixture after the heating, but their concentration does not increase when the distillation-heating step is practiced continuously.

The solvent mixture of acetic anhydride, acetic acid and acetyl chloride represents an equilibrium mixture dependent in part on the amount of oxygen and water present in the system; air and water leaks into the system are inevitable even though a conscious effort is made to eliminate them. Also, the chlorine commercially available includes a small amount of oxygen. When one starts operation with pure acetic anhydride, a small quantity of acetic acid and acetyl chloride soon appear in the system. By practicing the heating-distillation step upon the acetic anhydride, the build-up of acetyl chloride and acetic acid is prevented and the concentration of these is held below one whereat the yield of gamma isomer is reduced. By more extensive practice of the heating-distillation step, the quantity of acetic acid and acetyl chloride can be held to a minimum. We prefer to operate with not more than about 10% of the volume of the feed to the reactor made up of acetic acid and acetyl chloride.

If the distillation-heating step is not practiced, in a short time the acetic anhydride concentration will have decreased to one whereat the yield of gamma isomer is materially smaller and the acetic acid content becomes so large that it may freeze and so interfere with the process. By practicing the distillation and heating steps, the solvent mixture remains of a constant composition as the process is continued in operation; we have operated the process continuously with the only loss of acetic anhydride that occasioned by its solution in the hexachlorocyclohexane product which is removed.

In the drawings accompanying and forming a part hereof, the several figures each provide a diagram of an apparatus and flow sheet which can be employed to practice the invention on a continuous basis. To show a truly continuous operation, one can refer to the apparatus shown in Figure 1 in the drawing where we have shown a receiver 6 providing a reservoir for the solvent mixture. The reservoir is kept under a pressure slightly above that of the atmosphere by application of argon, helium or the like through line 7, to ensure oxygen is excluded from the solvent mixture. A benzene feed line 8 is provided through which fresh benzene is added to replace that which forms hexachlorocyclohexane; the benzene can be added at any convenient place and we have also added it through line 25. Material from the reservoir 6 is drawn out through line 9 under the control of valve 11 into the reactor, generally indicated at 12. The steady state chlorine concentration to be maintained at the temperature of operation is controlled by periodic sampling of the reaction mass, reaction with excess iodide ion, and titration of the sample with thiosulfate solution, a well-known procedure. The steady state chlorine concentration can also be controlled by a photo-electric cell which in turn varies the rate of chlorine supply or the intensity of illumination.

Means for refrigerating the reactor, generally indicated at 13, are utilized to maintain it at the desired temperature. Chlorine is introduced through line 16. Suitable means (not shown) are provided to maintain the mixture in the reactor agitated to maintain a homogeneous mass in the reaction zone. Products issuing from the reactor 12 pass through line 17 to a secondary reactor 20 where the excess chlorine present is reduced to a trace, and then through line 25 to a solvent preheater, generally indicated at 18; it is not necessary usually to refrigerate the secondary reactor, insulation usually being found sufficient. Any acetic anhydride required as make-up is added to line 25; the only addition required of the anhydride is to replace that removed with the product and which amounts to slightly less than 1% of the weight of the product.

A packed column section 51 is provided on the solvent preheater 18, the column being equivalent to at least a single theoretical plate. A reflux condenser 19 is provided above the column 51, the condenser having a gas vent line 52 for passing to waste hydrogen chloride and any inert gas present. Sufficient heat is supplied to the preheater 18 to maintain steady state conditions in the column 51. Material from the preheater 18 is taken through line 22 to boiler 23 under the control of a valve 24.

If the concentration in the system of acetyl chloride in relation to acetic acid increases, one can add a small quantity of water to column 51 to hydrolyze the acetyl chloride. In practice, commercial chlorine contains about two pounds or more of water per ton and this is usually sufficient to care for the acetyl chloride-acetic acid balance.

Materials volatilized in the boiler 23 are sent overhead through line 26 and are condensed by condenser 27 and then fed to a receiver 28 connected by a barometric leg 29 and a valve 31 to the reservoir 6. The receiver is kept under a vacuum applied through a vacuum pump (not shown) attached to line 32.

Liquid from the boiler 23 is withdrawn through line 33 under the control of valve 34 and is then passed into a final stripper 36, from which the product is drawn off through valve 37 and line 38. Solvent mixture from the final stripper 36 is handled through vapor line 39, being passed into condenser 41 and thence into a receiver 42, the latter being maintained under a vacuum applied by a suitable vacuum pump (not shown) to line 43. Solvent mixture from the receiver 42 is withdrawn through 44, under the control of valve 46 and returned to line 24. The solvent mixture collected in receivers 28 and 42 is condensed in an oxygen-free atmosphere.

To illustrate practice of the invention utilizing the foregoing apparatus: 23.22 pounds per hour of make-up benzene were added to the reservoir 6, while 2.35 gallons per minute of a benzene-acetic anhydride-carbon tetrachloride mixture were taken off and fed into the reactor 12. 64.08 pounds per hour of chlorine were introduced into the reactor 12, which was maintained at a temperature of −10° C. The stream issuing from the reactor 12 contained 2.13 grams per liter of free chlorine. The stream was passed through the secondary reactor 20 to reduce further the free chlorine present by reaction with the benzene. The entire reaction mass stream contained benzene, hexachlorocyclohexane, carbon tetrachloride, acetic anhydride, acetic acid and acetyl chloride was then sent into the solvent preheater 18, where the material was heated to above its boiling point at the pressure employed, e. g., 92° C. at atmospheric pressure. The composition of the stream in percent by volume, as determined with an infrared spectraphotometer, was as follows:

| | Percent |
|---|---|
| $C_6H_6$ | 8.2 |
| $C_6H_6Cl_6$ | 5.0 |
| $(CH_3CO)_2O$ | 55.0 |
| $CH_3COOH$ | 5.7 |
| $CH_3COCl$ | 7.7 |
| $CCl_4$ | 18.8 |
| | 100.4 |

In the solvent preheater, benzene, carbon tetrachloride, acetyl chloride and acetic acid volatilized as an azeotrope into the column 51 where the acetyl chloride and acetic acid reacted to form acetic anhydride and hydrogen chloride. The anhydride was returned to the preheater and the hydrogen chloride removed through line 52.

In the example, 0.32 pound of hydrogen chloride was taken off per hour. The composition of the material passing through line 22 was essentially the same as that entering the preheater because the change in composition effected in column 51 was too small to measure by usual analytical methods. The effect of the heating-distillation step can only be observed after some period of operation for, in the absence of the heating-distillation step, a gradual decrease occurs in the acetic anhydride concentration, while the concentrations of acetyl chloride and of acetic acid increase.

The material in line 22 passed under the control of valve 24 to the boiler 23 where the solvent mixture was vaporized and taken overhead through line 26 to the condenser 27. The receiver 28 was maintained at a pressure of 120–200 mms. of mercury. The solvent mixture was returned through the barometric leg 29 to the reservoir 6.

The liquid collected in boiler 23 was passed through line 33 into the final stripper 36 where the solvent mixture present was removed through line 39 to receiver 42; 86.66 pounds per hour of product were also taken off the stripper 36, of which 24.3 pounds were the gamma isomer of hexachlorocyclohexane, a 28.0% gamma isomer content. Receiver 42 was maintained under an absolute pressure of 25–35 mms. of mercury. The product contained 0.69 pound of acetic anhydride; an equal amount of acetice anhydride was added each hour to line 25.

The product taken off through line 38 was liquid and at a temperature of 150° C. It was stirred vigorously with water to remove the trace of acetic anhydride present and to form the material into fine pellets.

In the foregoing examples, light was utilized to activate the chlorine. The process of this invention is not limited to this agent for activating the chlorine and effecting its dissociation; one can use any agent effective to this end such as alpha particles, gamma rays, ethylene, propylene, or an organic peroxide, for the effect of these is well known.

Figure 2:
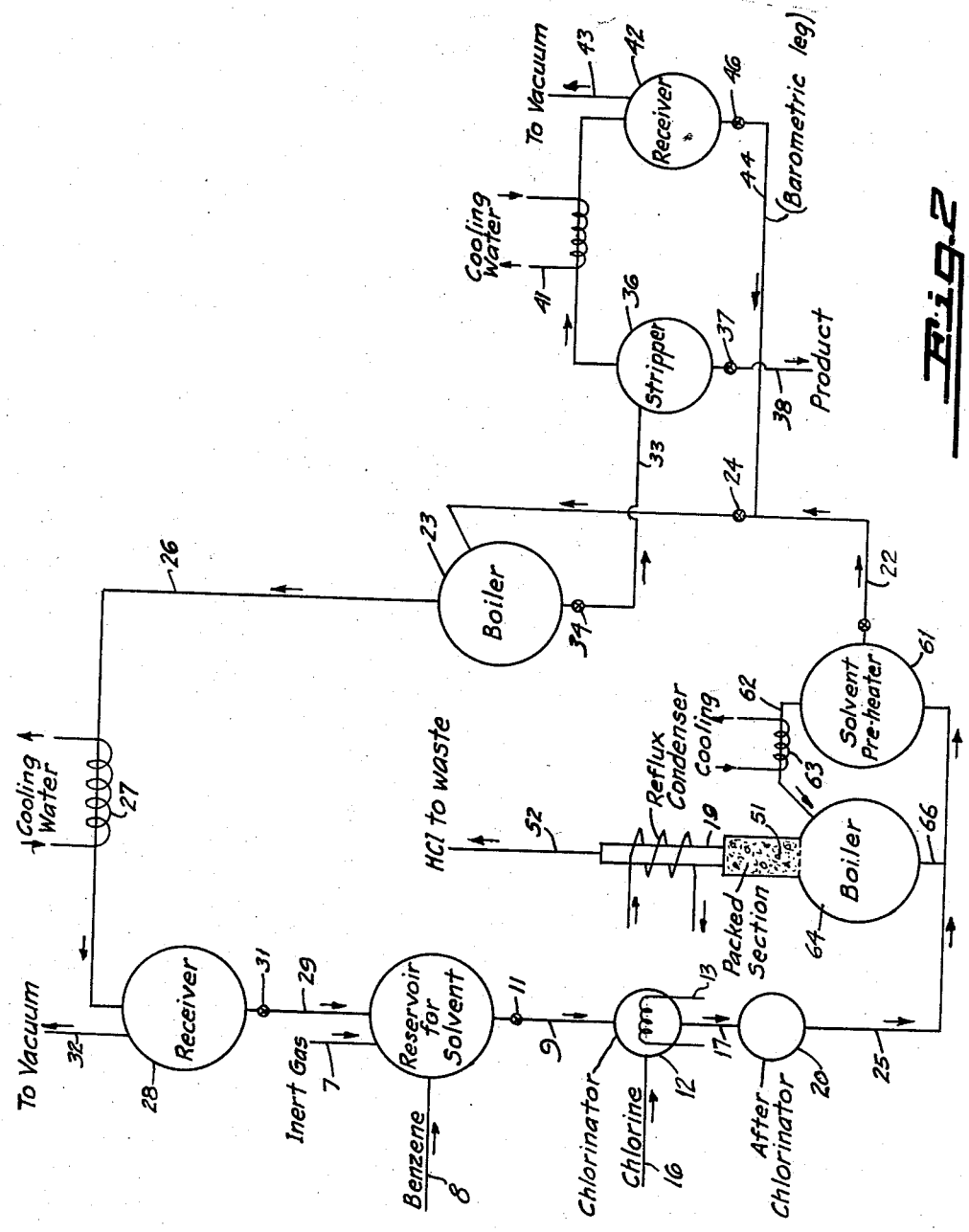

The acetyl chloride-acetic acid reformation to acetic anhydride and removal of the hydrogen chloride can be accomplished at various stages in the process and either before or after the removal of the product, hexachlorocyclohexane. Thus, in Figure 2, the stream from the afterchlorinator 20 is removed through line 25 to a solvent preheater 61. In the preheater, the temperature is raised to a point whereat a substantial portion of the acetic acid-acetyl chloride present is boiled off to pass through line 62 to a condenser 63 and thence to a boiler 64. The boiler 64 corresponds to the solvent preheater 18 in Figure 1 and includes a packed section 51, a reflux condenser 19, and an HCl vent 52. The reformed material from the boiler 64 passes through line 66 to the line 25.

In the apparatus assembly shown in Figure 3, the stream from the afterchlorinator 20 is sent directly through line 25 to the boiler 23 and the product, hexachlorocyclohexane, is then removed. The vapor stream from the boiler 23 passes through line 26 and condenser 27 to receiver 28. All or part of the stream passing through line 29 under the control of valves 31 and 53 to reservoir 10 is diverted through line 54 to the boiler 44, the regenerated solvent stream, free of acetic acid and acetyl chloride, being returned through line 56 and condenser 57 to the line 29 and thence to reservoir 6.

This is a continuation-in-part of application Serial No. 544,142, filed November 1, 1955, now abandoned.

We claim:

1. In a continuous process of manufacturing benzene hexachloride by the catalyzed chlorination of benzene in a liquid reaction mass in a reaction zone, the improvement comprising the continuously practiced steps of adding benzene to a reaction mass in a reaction zone containing acetic anhydride and carbon tetrachloride, the acetic anhydride and the carbon tetrachloride being each present in substantial excess of the volume of unreacted benzene present, maintaining said reaction mass at a temperature between 278° K. and 248° K., continuously adding chlorine at a rate sufficient to maintain a steady state free chlorine concentration in the mass between $(0.241 \times °K. - 53.8)$ and $(0.1776 \times °K. - 3.96)$ grams of chlorine per liter of reaction mass, removing continuously a portion of the reacting mass, heating said portion to react acetic acid and acetyl chloride and form acetic anhydride and hydrogen chloride, removing the hydrogen chloride and returning the acetic anhydride to said heated portion, recovering benzene hexachloride from said portion and returning the remainder to said reaction zone.

2. In a continuous process of manufacturing benzene hexachloride by the catalyzed chlorination of benzene in a liquid reaction mass in a reaction zone, the improvement comprising the continuously practiced steps of adding benzene to a reaction mass in a reaction zone containing acetic anhydride, maintaining said reaction mass at a temperature between 278° K. and 248° K., adding chlorine at a rate sufficient to maintain a steady state free chlorine concentration in the mass between $(0.241 \times °K. - 53.8)$ and $(0.01776 \times °K. - 396)$ grams of chlorine per liter of reaction mass, removing a portion of the reacting mass, heating said portion to react acetic acid and acetyl chloride and form acetic anhydride and hydrogen chloride, returning the acetic anhydride to the said portion, then recovering benzene hexachloride from the removed mass and returning the benzene hexachloride-free-portion to said reaction zone.

3. A process as in claim 2 wherein the benzene hexachloride is recovered as a hot liquid which is stirred vigorously in water to remove acetic anhydride present and to form the benzene hexachloride into pellets.

4. In a low temperature process for manufacture of benzene hexachloride, the steps of heating a solution of benzene hexachloride in a mixture of acetic acid, acetyl chloride and acetic anhydride to react acetic acid and acetyl chloride and form acetic anhydride and hydrogen chloride therefrom, removing the hydrogen chloride and returning the so-formed acetic anhydride to the solution, removing the benzene hexachloride from the solution and returning the remaining solution for formation of additional benzene hexachloride.

5. In a continuous process of manufacturing benzene hexachloride by the catalyzed chlorination of benzene in a liquid reaction mass in a reaction zone, the improvement comprising the continuously practiced steps of adding benzene to a reaction mass in a reaction zone containing acetic anhydride, acetic acid and acetyl chloride, maintaining said reaction mass at a temperature between 278° K. and 248° K., adding chlorine at a rate sufficient to maintain a steady state free chlorine concentration in the mass between (0.241×°K.−53.8) and (0.01776×°K.−3.96)

grams of chlorine per liter of reaction mass, removing a portion of the reacting mass containing acetic anhydride, acetic acid and acetyl chloride, heating said portion to react at least a portion of the acetic acid and acetyl chloride therein to form acetic anhydride and hydrogen chloride, separating the hydrogen chloride from the so-formed acetic anhydride, returning the so-formed acetic anhydride to said portion, and returning said portion to said reaction zone.

6. In a continuous process of manufacturing benzene hexachloride by the catalyzed chlorination of benzene in a liquid reaction mass in a reaction zone, the improvement comprising the continuously practiced steps of adding benzene to a reaction mass in a reaction zone containing acetic anhydride, acetic acid and acetyl chloride, maintaining said reaction mass at a temperature between 278° K. and 248° K., adding chlorine at a rate sufficient to maintain a steady state free chlorine concentration in the mass between (0.241×°K.−53.8) and (0.01776×°K.−3.96)

grams of chlorine per liter of reaction mass, removing a portion of the reacting mass containing acetic anhydride, acetic acid and acetyl chloride, adding a small quantity of water to the portion to hydrolyze acetyl chloride and form acetic acid, heating said portion to react at least a portion of the acetic acid and acetyl chloride therein to form acetic anhydride and hydrogen chloride, separating the hydrogen chloride from the so-formed acetic anhydride, returning the so-formed acetic anhydride to said portion, and returning said portion to said reaction zone.

7. In a continuous process of manufacturing benzene hexachloride by the catalyzed chlorination of benzene in a liquid reaction mass in a reaction zone, the improvement comprising the continuously practiced steps of adding benzene to a reaction mass in a reaction zone containing acetic anhydride and a chlorinated aliphatic hydrocarbon solvent for hexachlorocyclohexane, maintaining said reaction mass at a temperature between 278° K. and 248° K., adding chlorine at a rate sufficient to maintain a steady state free chlorine concentration in the mass between (0.241×°K.−53.8) and (0.01776×°K.−3.96) grams of chlorine per liter of reaction mass, removing a portion of the reacting mass, heating said portion to react acetic acid and acetyl chloride and form acetic anhydride and hydrogen chloride, returning the acetic anhydride to the said portion, then recovering benzene hexachloride from the removed mass and returning the benzene hexachloride-free portion to said reaction zone.

8. In a continuous process of manufacturing benzene hexachloride by the catalyzed chlorination of benzene in a liquid reaction mass in a reaction zone, the improvement comprising the continuously practiced steps of adding benzene to a reaction mass into a reaction zone containing a chlorinated aliphatic hydrocarbon as a solvent for hexachlorocyclohexane, ecetic anhydride, acetic acid and ecetyl chloride, maintaining said reaction mass at a temperature between 278° K. and 248° K., adding chlorine at a rate sufficient to maintain a steady state free chlorine concentration in the mass between (0.241×°K.−53.8) and (0.01776×°K.−3.96) grams of chlorine per liter of reaction mass, removing a portion of the reacting mass containing said solvent, acetic anhydride, acetic acid and acetyl chloride, heating said portion to react at least a portion of the acetic acid and acetyl chloride therein to form acetic anhydride and hydrogen chloride, separating the hydrogen chloride from the so-formed acetic anhydride, returning the so-formed acetic anhydride to said portion, and returning said portion to said reaction zone.

9. In a continuous process of manufacturing benzene hexachloride by the catalyzed chlorination of benzene in a liquid reaction mass in a reaction zone, the improvement comprising the continuously practiced steps of adding benzene to a reaction mass in a reaction zone containing a chlorinated aliphatic hydrocarbon as a solvent for hexachlorocyclohexane, acetic anhydride, acetic acid and acetyl chloride, maintaining said reaction mass at a temperature betgeen 278° K. and 248° K., adding chlorine at a rate sufficient to maintain a steady state free chlorine concentration in the mass between (0.241×°K.−53.8) and (0.01776×°K.−3.96) grams of chlorine per liter of reaction mass, removing a portion of the reacting mass containing said solvent, acetic anhydride, acetic acid and acetyl chloride, adding a small quantity of water to the portion to hydrolyze acetyl chloride and form acetic acid, heating said portion to react at least a portion of the acetic acid and acetyl chloride therein to form acetic anhydride and hydrogen chloride, separating the hydrogen chloride from the so-formed acetic anhydride, returning the so-formed acetic anhydride to said portion, and returning said portion to said reaction zone.

10. In a continuous process of manufacturing benzene hexachloride by the catalyzed chlorination of benzene in a liquid reaction mass in a reaction zone, the improvement comprising the continuously practiced steps of adding benzene to a reaction mass in a reaction zone containing carbon tetrachloride as a solvent for hexachlorocyclohexane, acetic anhydride, acetic acid and acetyl chloride, maintaining said reaction mass at a temperature between 278° K. and 248° K., adding chlorine at a rate sufficient to maintain a steady state free chlorine concentration in the mass between (0.241×°K.−53.8) and (0.01776×°K.−3.96) grams of chlorine per liter of reaction mass, removing a portion of the reacting mass containing said solvent, acetic anhydride, acetic acid and acetyl chloride, adding a small quantity of water to the portion to hydrolyze acetyl chloride and form acetic acid, heating said portion to react at least a portion of the acetic acid and acetyl chloride therein to form acetic anhydride and hydrogen chloride, separating the hydrogen chloride from the so-formed acetic anhydride, returning the so-formed acetic anhydride to said portion, and returning said portion to said reaction zone.

References Cited in the file of this patent

UNITED STATES PATENTS

| 2,558,363 | Kolka et al. | June 26, 1951 |
| 2,717,238 | Neubauer et al. | Sept. 6, 1955 |

OTHER REFERENCES

Degering et al.: "An Outline of Organic Chemistry," third edition, pp. 82–3 (1939).